US011747832B2

(12) United States Patent
Dayan et al.

(10) Patent No.: US 11,747,832 B2
(45) Date of Patent: Sep. 5, 2023

(54) UNMANNED AERIAL VEHICLE (UAV) SYSTEMS AND METHODS FOR MAINTAINING CONTINUOUS UAV OPERATION

(71) Applicant: EASY AERIAL INC., Brooklyn, NY (US)

(72) Inventors: Omri Dayan, Brooklyn, NY (US); Jason Felder, Highland Park, NJ (US); Ido Gur, New York, NY (US)

(73) Assignee: EASY AERIAL INC., Brooklyn, NY (US)

( * ) Notice: Subject to any disclaimer, the term of this patent is extended or adjusted under 35 U.S.C. 154(b) by 406 days.

(21) Appl. No.: 16/928,195

(22) Filed: Jul. 14, 2020

(65) Prior Publication Data
US 2022/0019247 A1 Jan. 20, 2022

(51) Int. Cl.
*B64C 39/02* (2023.01)
*G05D 1/00* (2006.01)
*G05D 1/10* (2006.01)
*B64F 1/22* (2006.01)
*B64F 1/36* (2017.01)
*B64U 10/13* (2023.01)
*B64U 50/19* (2023.01)
*B64U 70/00* (2023.01)
*B64U 80/00* (2023.01)
*B64U 101/00* (2023.01)

(52) U.S. Cl.
CPC ........... *G05D 1/104* (2013.01); *B64C 39/024* (2013.01); *B64F 1/222* (2013.01); *B64F 1/362* (2013.01); *B64U 10/13* (2023.01); *B64U 50/19* (2023.01); *B64U 70/00* (2023.01); *B64U 80/00* (2023.01); *B64U 2101/00* (2023.01)

(58) Field of Classification Search
CPC ........ G05D 1/104; G05D 1/00; B64C 39/024; B64C 2201/027; B64C 2201/042; B64C 2201/08; B64C 2201/12; B64C 2201/20; B64C 2201/201; B64C 39/02; B64F 1/222; B64F 1/362; B64F 1/00
See application file for complete search history.

(56) References Cited

U.S. PATENT DOCUMENTS

| | | | |
|---|---|---|---|
| 9,505,494 B1 | 11/2016 | Marlow et al. | |
| 9,508,263 B1 | 11/2016 | Teng et al. | |
| 9,611,038 B2 | 4/2017 | Dahlstrom | |
| 9,618,940 B1 | 4/2017 | Michini et al. | |
| 10,303,415 B1 * | 5/2019 | Ananthanarayanan | G06F 3/1446 |
| 10,470,241 B2 * | 11/2019 | Shaw | H04W 84/18 |
| 10,761,525 B2 | 9/2020 | Bethke et al. | |
| 11,089,606 B1 * | 8/2021 | Shetty | H04W 16/18 |

(Continued)

*Primary Examiner* — Yonel Beaulieu
(74) *Attorney, Agent, or Firm* — Carter, DeLuca & Farrell LLP; George Likourezos (57) ABSTRACT

An unmanned aerial vehicle (UAV) system for maintaining UAV flight continuity, includes a ground station, a first UAV, a second UAV, a processor, and a memory. The memory contains instructions thereon, which, when executed by the processor in response to receiving a remaining battery charge signal from the first UAV, selectively deploy the second UAV from the ground station when the remaining battery charge signal indicates that a remaining battery charge of the first UAV is below a threshold value, and return the first UAV to the ground station.

17 Claims, 7 Drawing Sheets

(56) References Cited

U.S. PATENT DOCUMENTS

| | | |
|---|---|---|
| 2016/0039542 A1* | 2/2016 | Wang ................. B60L 53/53 |
| | | 244/114 R |
| 2017/0229022 A1 | 8/2017 | Gurel et al. |
| 2018/0129879 A1* | 5/2018 | Achtelik ............. G01C 11/06 |
| 2018/0375567 A1* | 12/2018 | Fan .................... H04B 7/2606 |
| 2019/0248488 A1* | 8/2019 | Yakimenko ......... B64C 39/024 |
| 2020/0064869 A1* | 2/2020 | Pickett ............... H04N 7/181 |
| 2022/0110002 A1* | 4/2022 | Shetty ................ H04W 16/18 |

* cited by examiner

UNMANNED AERIAL VEHICLE (UAV) SYSTEMS AND METHODS FOR MAINTAINING CONTINUOUS UAV OPERATION

TECHNICAL FIELD

This disclosure relates to aircraft, and more particularly, to unmanned aerial vehicle (UAV) systems and methods for maintaining UAV flight continuity.

BACKGROUND

Security and surveillance often employ UAV systems with tethered drones that can remain in flight for long and continuous durations because constant power can be delivered to the drone via the tethered connection to an immobile ground station. Unfortunately, when surveillance of remote or enlarged areas is required, the tethered drones may not be sufficient. To that end, solutions exist that mount the tethered drone to a mobile platform (a pickup truck, for example). Still, such solutions still fall short since the tethered drone can only "fly" in the vicinity where the mobile platform can drive, preventing the drone from accessing more remote locations. Other solutions employ ground stations that store multiple batteries, and, when an untethered drone returns to the ground station with depleted batteries, the depleted batteries are replaced with charged batteries. This solution maintains the strategic advantage of using untethered drones to access remote locations; however, the technology required for battery swapping results in a large ground station footprint, which itself is complex, expensive, and often employs highly precise motion robotics.

SUMMARY

In accordance with aspects of the present disclosure, an unmanned aerial vehicle (UAV) system for maintaining UAV flight continuity, includes a ground station, a first UAV, a second UAV, a processor, and a memory. The memory contains instructions thereon, which, when executed by a processor, cause the system to receive a remaining battery charge signal from the first UAV, selectively deploy the second UAV, from the ground station when remaining battery charge signal indicates that a remaining battery charge of the first UAV is below a threshold value, and return the first UAV to the ground station.

In an aspect of the disclosure, the ground station may include a base plate, a first linear rail, a first linear slider, a scissor lift, a second linear rail, and a second linear slider. The base plate may include a first surface, a second surface, a proximal portion, a mid-portion and a distal portion, the mid-portion including a pivot member configured for lateral rotation of the base plate, the first surface configured to store and charge the first UAV and the second surface configured to store and charge the second UAV. The first linear slider is disposed on the first linear rail. The scissor lift may be configured to raise the mid-portion of the base plate. The scissor lift may include a top portion including a worm drive configured to rotate the base plate, a first leg fixedly attached to a first sidewall of the ground station, a second leg pivotably attached to the first linear slider, and a motor configured to actuate the second leg. The second linear slider is disposed on the second linear rail, pivotably connected to the proximal portion of the base plate, and configured for lateral motion along the second linear rail.

In an aspect of the present disclosure, the instructions, when executed by the processor, may further cause the system to charge the battery of the first UAV, without removal of the battery, by the ground station.

In another aspect of the present disclosure, the base plate may further include a first position where the first UAV is in a launch position and the second UAV is in a storage position, and a second position where the second UAV is in the launch position and the first UAV is in the storage position.

In yet another aspect of the present disclosure, when selectively deploying the second UAV, the instructions, when executed by a processor, may further cause the system to rotate the base plate of the ground station from the first position to the second position.

In a further aspect of the present disclosure, when selectively deploying the second UAV, the instructions, when executed by a processor, may further cause the system to determine location information of the first UAV and communicate the location information of the first UAV to the second UAV.

In yet a further aspect of the present disclosure, when selectively deploying the second UAV, the instructions, when executed by a processor, may further cause the system to determine a charge state of the first UAV.

In an aspect of the present disclosure, when rotating the base plate of the ground station from the first position to the second position, the instructions, when executed by a processor, may further cause the system to extend the scissor lift by actuating, by the motor, a second leg of the scissor lift, the scissor lift configured to raise a mid-portion of the base plate and rotate the base plate by advancing the worm drive.

In another aspect of the present disclosure, the instructions, when executed by a processor, may further cause the system to rotate by a cross mechanism of the base plate, the first UAV to align the first UAV with a battery charger of the ground station.

In yet another aspect of the present disclosure, the ground station may further include a wireless transceiver configured to communicate battery status and location of the first UAV to a remote server.

In accordance with aspects of the present disclosure, a computer-implemented method for maintaining UAV flight continuity includes: receiving a remaining battery charge signal from a first UAV; selectively deploying a second UAV, from a ground station when the remaining battery charge signal indicates that a remaining battery charge of the first UAV is below a threshold value; and returning the first UAV to the ground station.

In an aspect of the present disclosure, the method may further include charging the battery of the first UAV, without removal of the battery, by the ground station.

In another aspect of the present disclosure, the ground station may include a baseplate including a first position where the first UAV is in a launch position and the second UAV is in a storage position, and a second position where the second UAV is in a launch position, and the first UAV is in a storage position.

In a further aspect of the present disclosure, selectively deploying the second UAV may include rotating a base plate of the ground station from the first position to the second position.

In yet a further aspect of the present disclosure, selectively deploying the second UAV may further include determining location information of the first UAV and communicating, to the second UAV, the location information of the first UAV.

In yet another aspect of the present disclosure, rotating the base plate of the ground station from the first position to the second position may include extending a scissor lift by actuating, by a motor, a first leg of the scissor lift, the scissor lift configured to raise a mid-portion of the baseplate. A second leg is fixedly attached to a first sidewall of the ground station, and the first leg is disposed on a linear slider and the baseplate is rotated by advancing a worm drive disposed on a top portion of the scissor lift. A proximal portion of the base plate may be pivotably connected to a second linear slider configured for lateral motion along a second linear rail.

In an aspect of the present disclosure, the method may further include rotating, by a cross mechanism, the first UAV to align the first UAV with a battery charger.

In another aspect of the present disclosure, the ground station may further include a wireless transceiver configured to communicate battery status and location to a remote server.

In accordance with aspects of the present disclosure, ground station includes a base plate, a first linear rail, a first linear slider disposed on the first linear rail, a scissor lift, and a second linear rail.

The base plate includes a first surface, a second surface, a proximal portion, a mid-portion and a distal portion. The mid-portion includes a pivot member configured for lateral rotation of the base plate, the first surface is configured to store and charge a first unmanned aerial vehicle (UAV), and the second surface is configured to store and charge a second UAV. A second linear slider disposed on the second linear rail and pivotably connected to the proximal portion of the base plate, is configured for lateral motion along the second linear rail. The scissor lift is configured to raise the mid-portion of the base plate, and includes a top portion including a worm drive configured to rotate the base plate, a first leg fixedly attached to a first sidewall of the ground station, a second leg pivotably attached to the first linear slider, and a motor configured to actuate the second leg. The base plate further includes a first position where the first UAV is in a launch position and the second UAV is in a storage position, and a second position where the second UAV is in the launch position and the first UAV is in the storage position.

In an aspect of the present disclosure, the instructions, when executed by the processor, may further cause the system to transfer surveillance duties from the first UAV to the second UAV.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Figure 1:
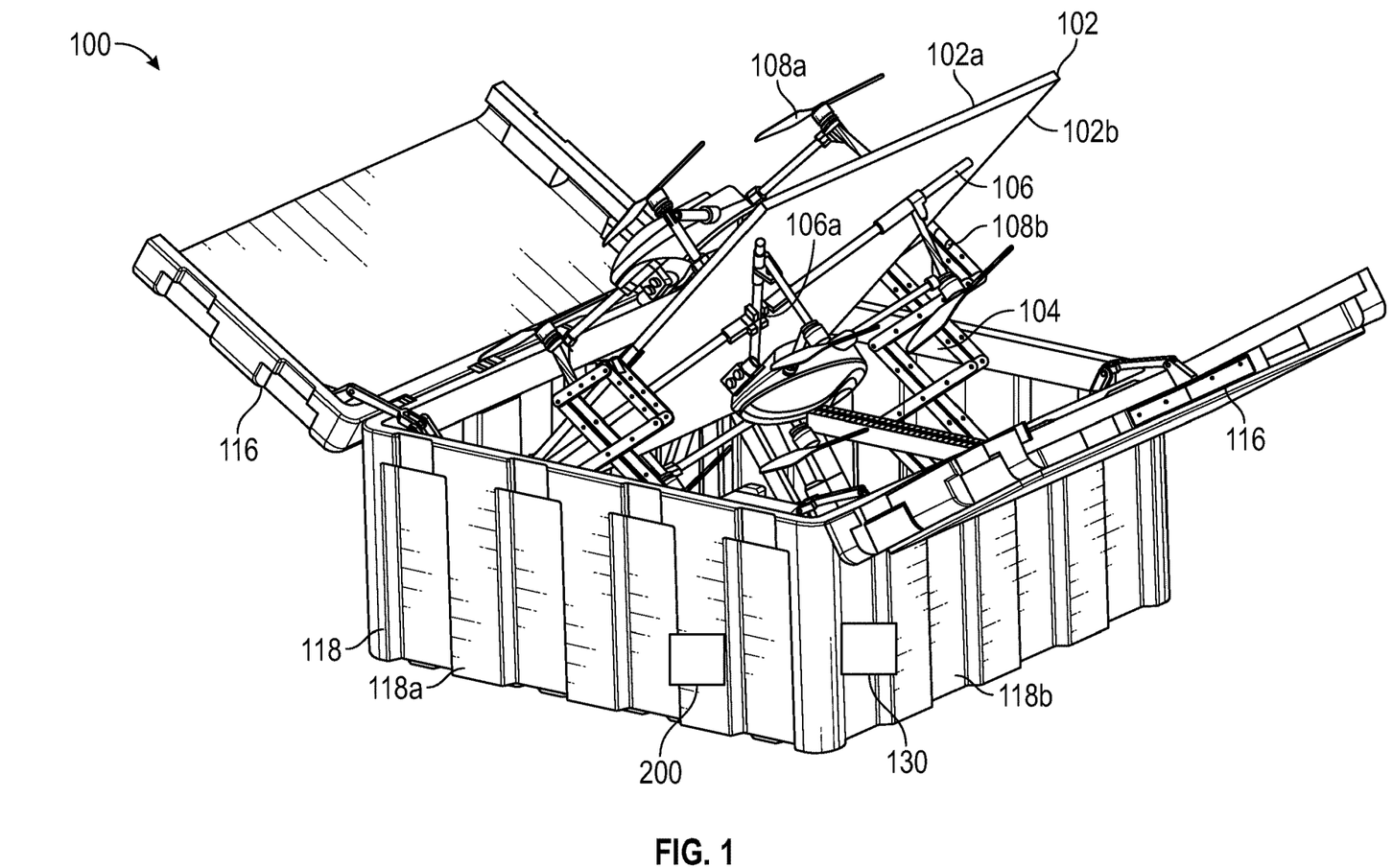
FIG. 1 is a perspective view of an unmanned aerial vehicle (UAV) system including a ground station and untethered UAVs in accordance with the principles of this disclosure.

FIG. 1 illustrates an unmanned aerial vehicle (UAV) system 100. The system 100 generally includes a ground station 118 that houses two or more UAVs 108*a*, 108*b* (e.g., drones) and a controller 200.

Briefly, in order to enable continuous surveillance of an area, one of the UAVs remains securely inside the ground station (e.g., charging), while the other UAV is deployed for patrol (surveillance). Once a battery charge reduces to a predetermined threshold, the UAV that is in the ground station is deployed to maintain constant surveillance and the deployed UAV returns to the ground station for recharging. The UAV at the ground station can be deployed before and/or after the deployed UAV returns for charging. In aspects, both can be charged simultaneously while stationed at the ground station. In aspects, the UAVs 108*a*, 108*b* may be deployed from the ground station 118 at the same time to enable both UAVs 108*a*, 108*b* to patrol an area simultaneously for predetermined time periods.

More specifically, as the system 100 recognizes that the deployed UAV's battery is nearing depletion, it rotates the base plate (e.g., a landing pad), for example, 180 degrees in the case of a two UAV system (although the base plate may be positioned to rotate through any suitable angular rotation), readying the next fully charged drone for flight. In aspects, after the second UAV, which is charged (e.g., fully) deploys to the location of the first UAV, which has wholly or partially discharged (e.g., nearly depleted power source), surveillance duties are transferred seamlessly to the second UAV, and the first UAV then returns to the ground station 118 for recharging. After the first UAV touches down, the base plate 102 may rotate again, securing the returned first UAV inside the ground station 118, and charging the battery of the discharged first UAV. It is contemplated that the system 100 may utilize more than two UAVs, and accordingly, the base plate 102 would rotate by a different amount. As can be appreciated, base plate 102 can have any suitable configuration for hosting any number of UAVs, for example, a base triangle (e.g., with three interconnected plates to host at least 3 UAVs such as one on each of the three outer surfaces of the triangle and/or one or more on each of the inner and/or outer surfaces thereof), a base square (e.g., with four interconnected plates to host at least 4 UAVs such as one on each of the four outer surfaces of the square and/or one or more on the inner and/or outer surfaces thereof), etc.

Instead of swapping batteries within one UAV, the system 100 can swap a UAV with a wholly or partially discharged battery for a UAV with a charged battery without increasing the ground station 118 footprint, and without requiring complex robotics. The following mechanics allows the ground station base plate 102 to extend out of the ground station 118 during rotation.

With reference to FIGS. 1-5, the ground station 118 generally includes a base plate 102, a battery charger 130, a frame 120, sidewalls 118a, 118b, a scissor lift 104, a first linear rail 404, a second linear rail 112, a first slider 408, and a second slider 110. The battery charger 130 is configured to charge the batteries of the UAVs 108a, 108b when the UAVs 108a, 108b are mounted to the base plate 102, either individually or collectively.

The UAV(s) 108a, 108b generally include a rechargeable battery (not shown), a positioning system (e.g., GPS), a video system (not shown), and a wireless communication transceiver (not shown). The wireless transceiver is configured to communicate video, geolocation from the positioning system, and any relevant status of the UAV, or components thereof, such as battery status of the UAV, to the ground station or other monitoring stations in accordance with any suitable techniques known to persons of ordinary skill in the art.

Referring again to FIGS. 1 and 2, the base plate 102 includes a first surface 102a, a second surface 102b, a proximal portion 102e, a mid-portion 102d, and a distal portion 102c. The first surface 102a includes a cross mechanism 106 and is configured to store and charge a first UAV 108a. The second surface 102b includes a cross mechanism 106 and is configured to store and charge a second UAV 108b. The cross mechanism 106 is configured to rotate the UAV(s) 108a, 108b. In particular, the cross mechanism 106 is driven by a motor (106a) that imparts a rotational force on the cross mechanism 106, rotating the cross mechanism 106 clockwise or counterclockwise. In an aspect of the disclosure, the cross mechanism 106 may receive a command from the controller 200 to rotate the UAV(s) 108a, 108b, for example, for better positioning relative to a targeted location to which the UAV is programmed to fly. The cross mechanism 106 may also be configured for mounting the UAV 108a, 108b to the respective surface of the base plate 102 (e.g., the first surface 102a and/or the second surface 102b). For example, the cross mechanism 106 may include a clamp, a hook, and/or a magnet to catch/capture the legs of the UAV for secure mounting. The cross mechanism 106 may also be configured to provide a conductive path for charging the UAV's battery. The UAV may be held to the base plate 102 by magnets.

Figure 2:
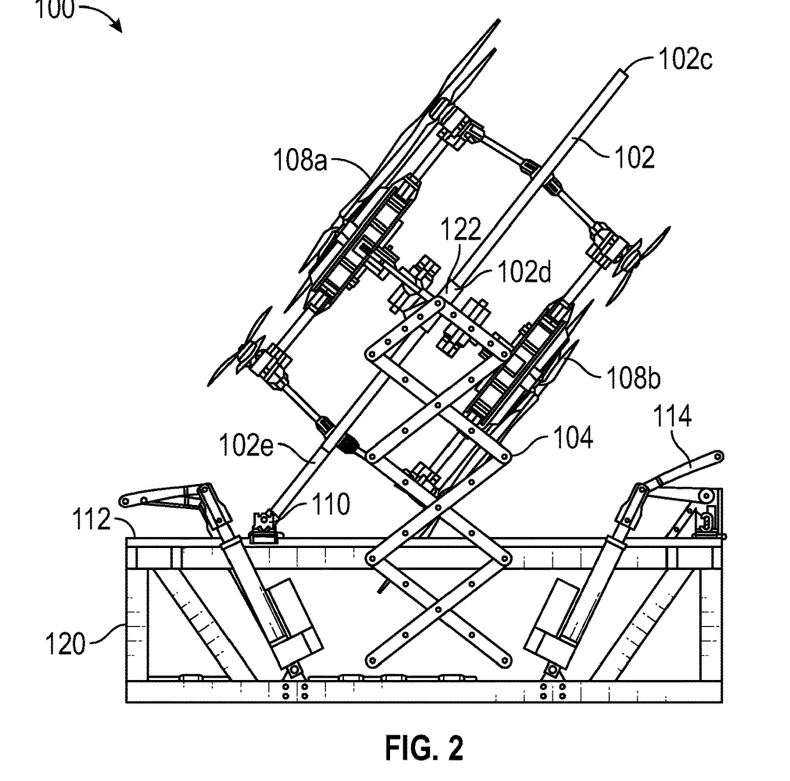
FIG. 2 is a side view of the UAV system of FIG. 1 with portions thereof removed for clarity and with the ground station shown in an extended position.
Figure 3:
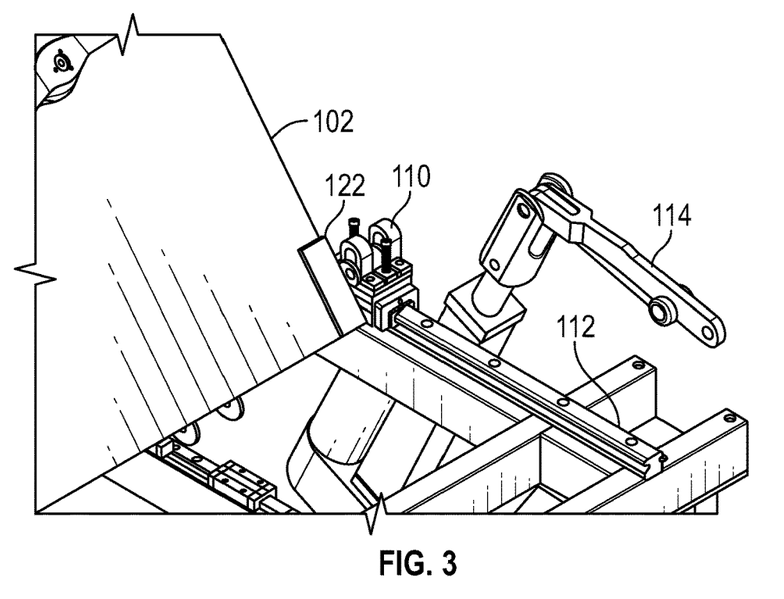
FIG. 3 is an enlarged, perspective view of a linear rail and a linear slide of the ground station shown in FIGS. 1 and 2.
Figure 4:
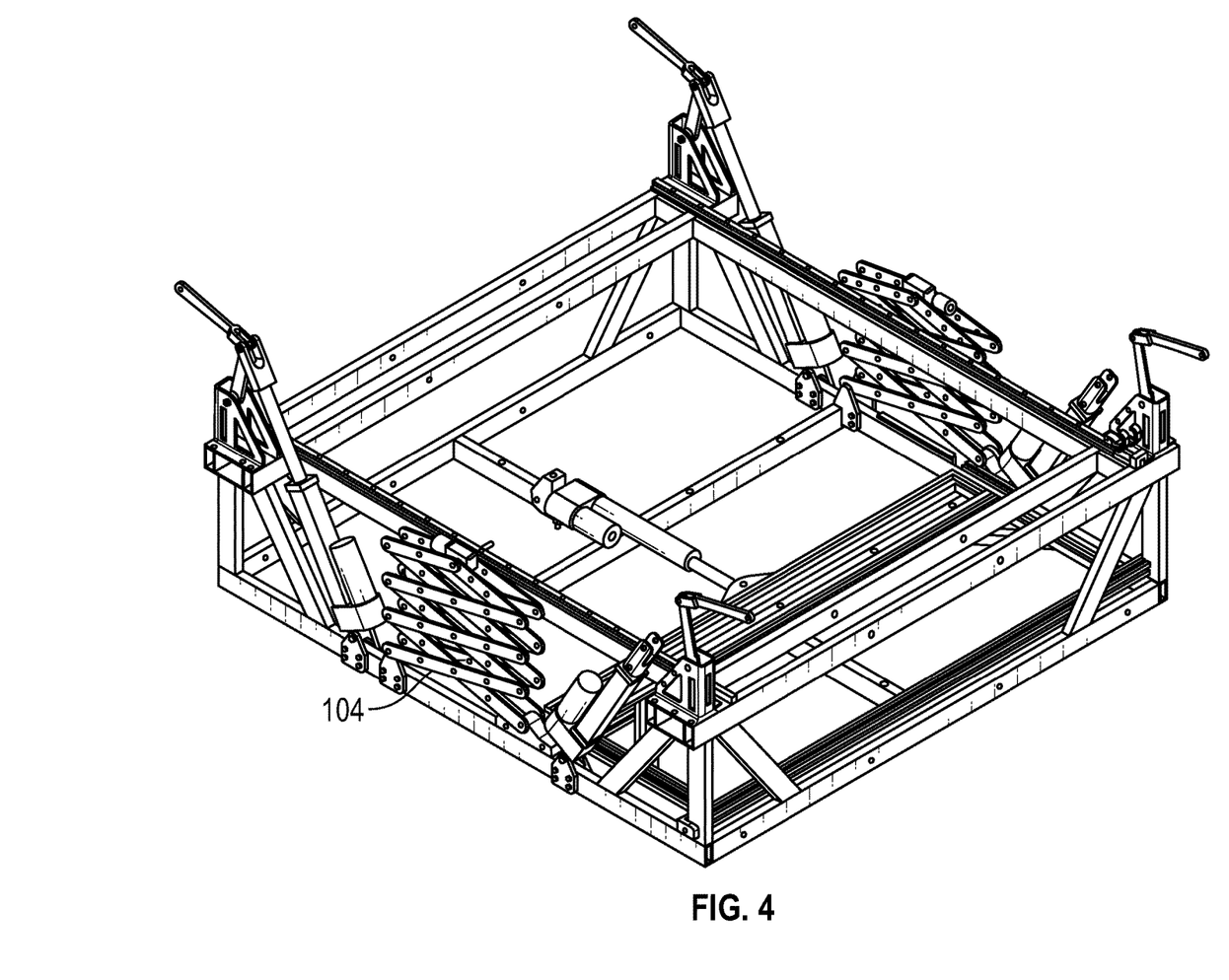
FIG. 4 is a perspective view of the ground station of FIG. 1, the ground station shown in a retracted position and with portions removed for clarity.
Figure 5:
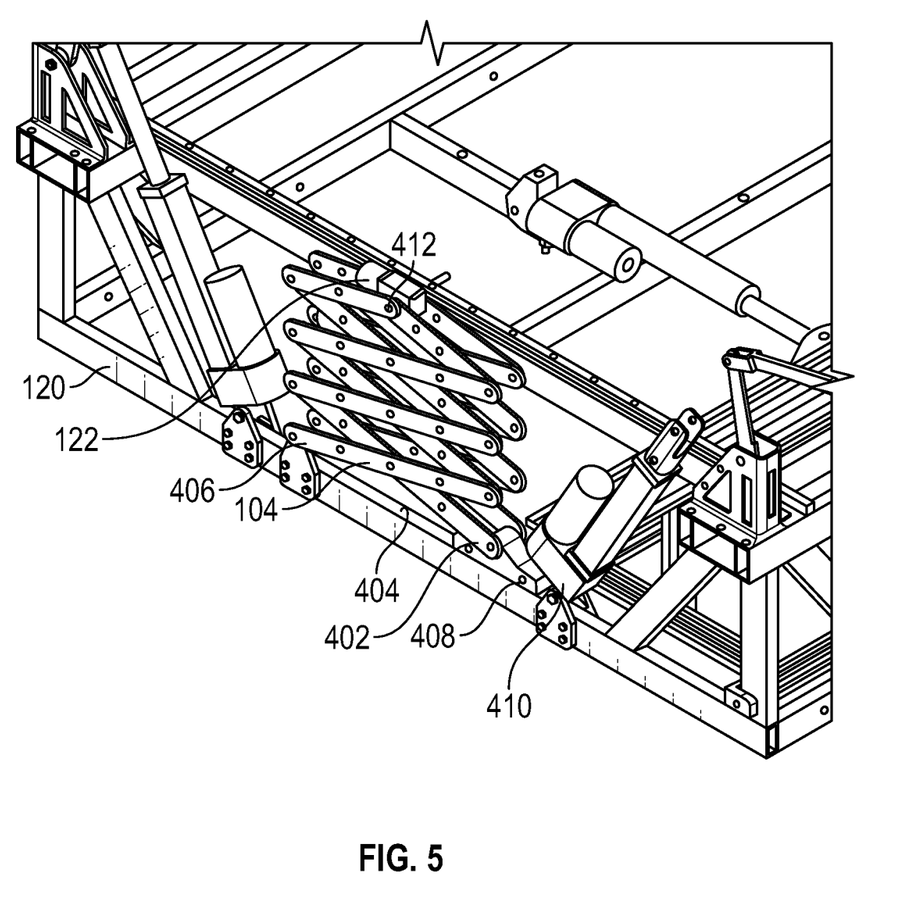
FIG. 5 is an enlarged perspective view of a portion of the ground station of FIG. 4.
Figure 6:
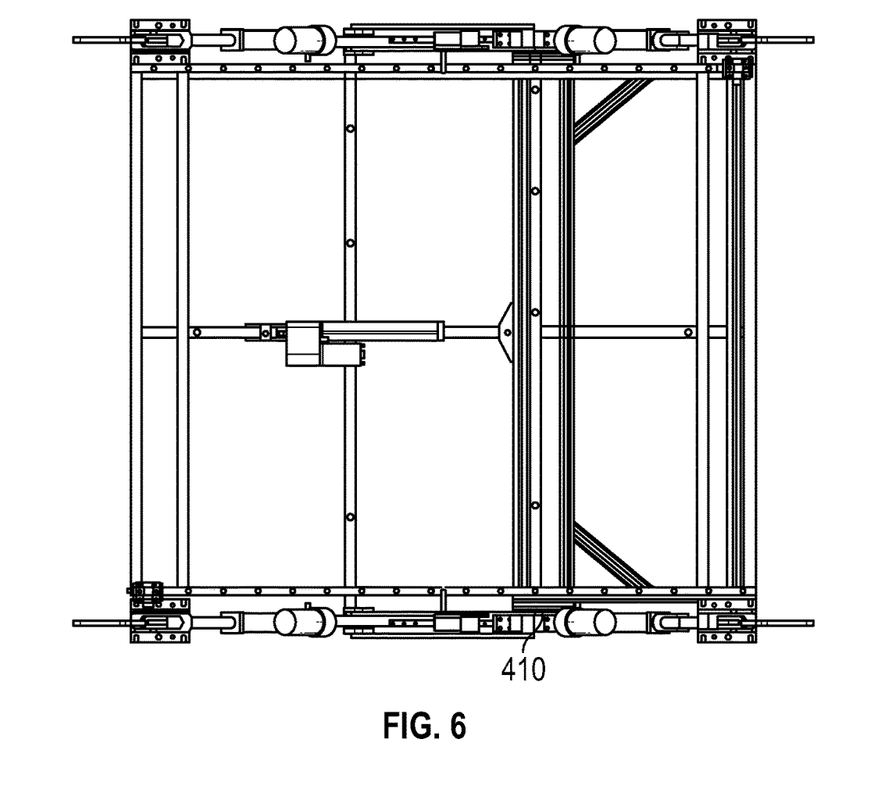
FIG. 6 is a top view of a portion of the ground station of FIG. 4 illustrating a linear rail and a linear slide thereof.

The mid-portion 102d of the baseplate includes a pivot member 122 configured for lateral rotation of the base plate 102. The proximal portion 102e of the base plate 102 is pivotably connected to a second linear slider 110 disposed on the second linear rail 112.

For a two UAV system, the base plate 102 includes two positions. The first position where the first UAV can launch (see 802 in FIG. 8—the second UAV may be in a storage position within the ground station beneath the base plate 102 or deployed), and a second position, where the baseplate is rotated 180 degrees relative to the first position, and where the second UAV can launch (see 812 in FIG. 8—the first UAV may be in a storage position within the ground station beneath the base plate 102 or deployed). For example, in the storage position, the UAV's battery may be charged using either inductive charging, and/or charge via electrical charging contacts, for example in the UAV's landing feet. For a UAV system with more UAVs, there may be a commensurate number of positions. For example, for a three UAV system, there may be three positions.

The battery charger 130 may be configured to monitor the charge of the stored UAV's battery so that the system 100 can estimate a flight time of the stored UAV based on a real-time charge of the battery.

Referring to FIGS. 2-6, the scissor lift 104 includes one degree of freedom, and is actuated by a motor 410 to lift and/or lower the base plate 102 relative to the frame 120 and/or sidewalls 118a, 118b of ground station 118 at the mid-portion 102d of the base plate 102. The scissor lift 104 includes a top portion 122, a fixed leg 406 fixedly attached to the frame 120 of the ground station 118, an actuated leg 402 pivotably attached to the first linear slider 408, and a motor 410 (e.g., a linear actuator) configured to actuate the actuated leg 402. The first linear slider 408 is movably disposed on the first linear rail 404 of frame 120. The scissor lift 104 is configured to raise the mid-portion 102d of the base plate 102. The top portion 122 of the scissor lift 104 includes a worm drive 412 located at a center pivot axis and connected to the pivot member 122. The worm drive 412 rotates the base plate 118 as the base plate 102 passes through the vertical plane—a "neutral zone" in which the vertical motion of the scissor lift 104 and horizontal motion of the linear rail 404 are insufficient to rotate the landing pad.

The second linear slider 110 is movably disposed on the second linear rail 112 and pivotably connected to the proximal portion 102e of the base plate 102. The second linear slider 110 is configured for lateral motion along the second linear rail 112.

Figure 7:
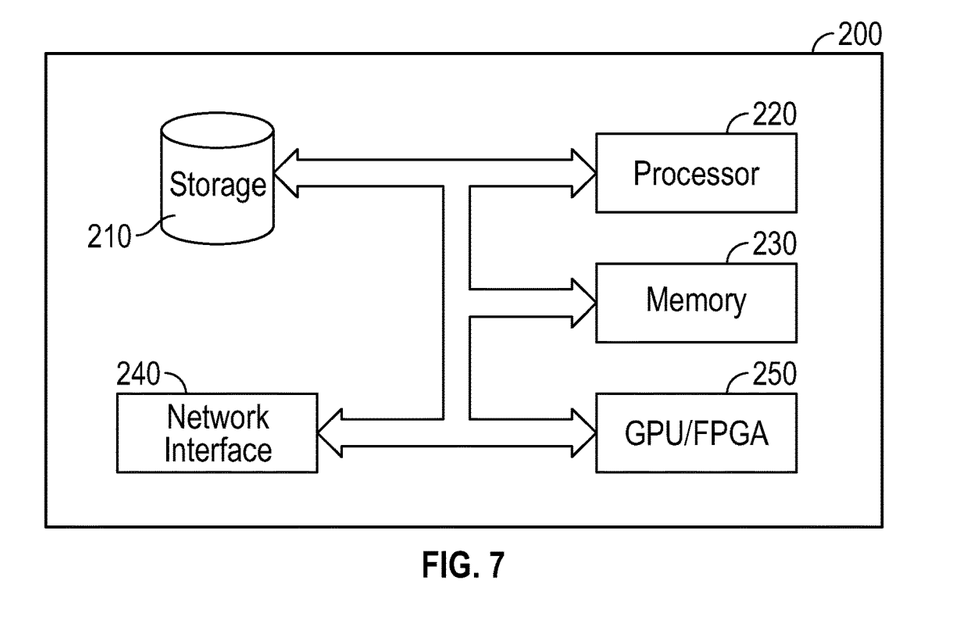
FIG. 7 is a block diagram of a controller configured for use with UAV system of FIG. 1.

FIG. 7 illustrates the controller 200 that includes a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive among other data, the UAV battery status and UAV location, and control, among other features, the baseplate's position and deployment of the UAVs. The controller 200 may be further configured to control the operation of the storage and deployment of the UAVs.

Figure 8:
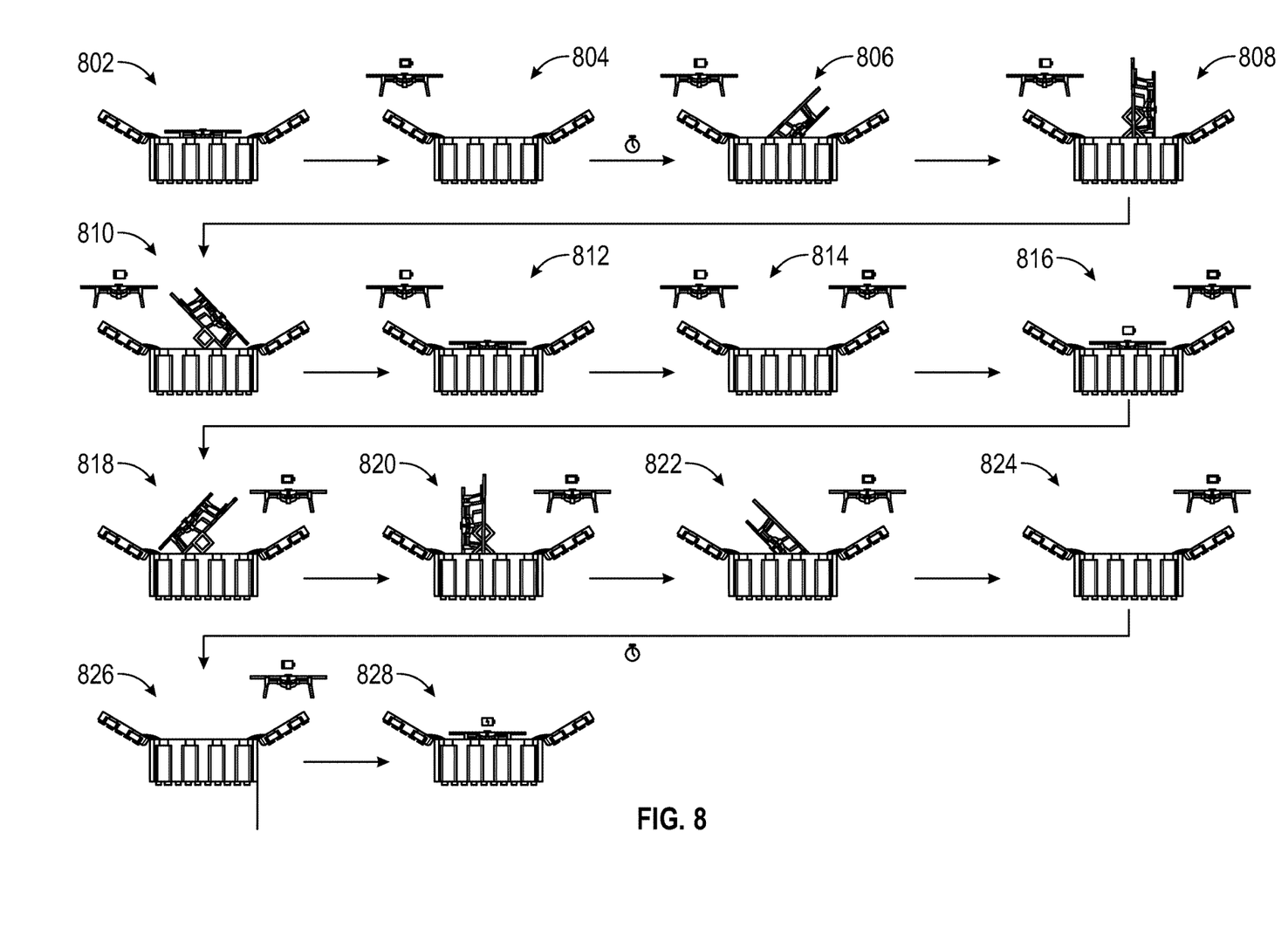
FIG. 8 is a progressive view illustrating the UAVs of the UAV system of FIG. 1 shifting between charging positions and flying positions.

FIG. 8 is a progressive view illustrating the UAVs of the UAV system of FIG. 1 shifting between charging positions and flying positions. At step 802, two UAVs are supported by the ground station. At step 804, a first UAV located on a first side of the base plate is deployed from the ground station. At steps 806-812, the base plate is rotated 180 degrees from a first position to a second position to allow the deployment of the second UAV. At step 814, the second UAV is deployed while the first UAV is still deployed. Surveillance duties may be transferred seamlessly between the first UAV and second UAV, maintaining continuous UAV operation.

At step 816, the first UAV lands on the base plate and is securely attached to the base plate. At steps 818-826, the base plate rotates from the second position to the first position. At step 828, the second UAV returns to the ground station for storage.

Figure 9:
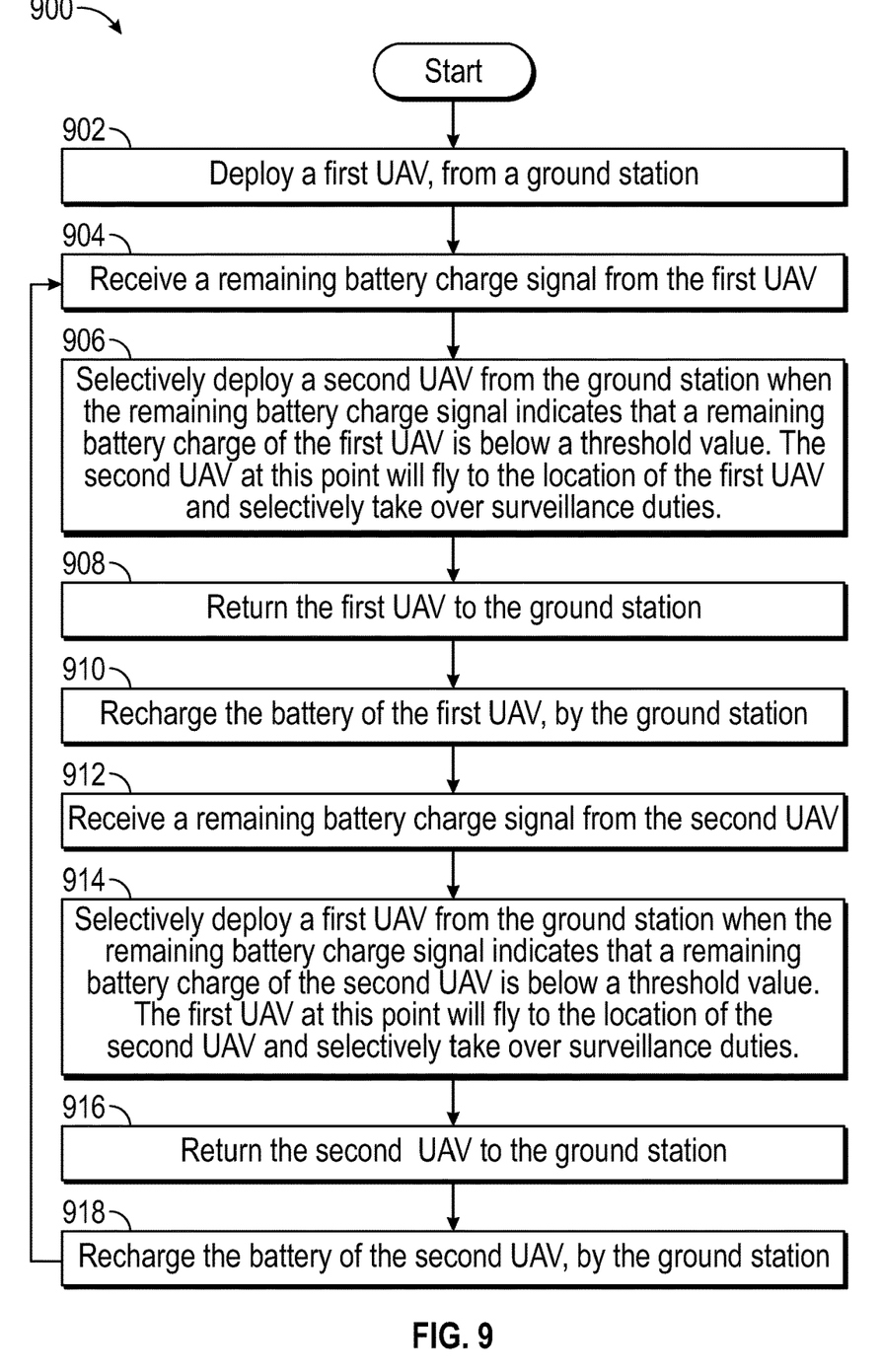
FIG. 9 is a block diagram of an exemplary method for maintaining UAV flight continuity in accordance with the disclosure.

FIG. 9 shows a flow chart illustrating the various operations of an exemplary method for maintaining UAV flight continuity. Persons skilled in the art will appreciate that one or more operations of the method 900 may be performed in a different order, repeated, and/or omitted without departing from the scope of the disclosure. In various aspects, the illustrated method 900 can operate in controller 200 (FIG. 7), in a remote device, or in another server or system. Other variations are contemplated to be within the scope of the disclosure. The operations of method 900 will be described with respect to a controller, e.g., controller 200 (FIG. 7) of system 100 (FIG. 1), but it will be understood that the illustrated operations are applicable to other systems and components thereof as well.

Initially, at step 902, a first UAV is deployed from a ground station.

Next, at step 904, a battery charge signal indicating a remaining battery charge of the first UAV is received by the controller. For example, the first UAV may be patrolling/surveilling a site, and based on the battery charge, only has a few minutes left of flight time. The first UAV may wirelessly transmit a signal with data including its current battery charge status, as well as geolocation, and/or video to the ground station and/or to a remote monitoring station.

While the first UAV is out patrolling, the ground station may rotate the plate from a first position to a second position to permit the deployment of the second UAV.

Next, at step 906, a second UAV is selectively deployed from the ground station when the remaining battery charge signal of the first UAV is below a threshold value. For example, when data indicating the battery charge of the first UAV is less than a predetermined number, for example, 20%, the second UAV is prepared for deployment by rotating the base plate of the ground station from a first position to a second position, where the second UAV is in a launch position. The second UAV at this point will fly to the location of the first UAV and take over the surveillance duties. The threshold may be predetermined and/or dynamically calculated based on the current consumption of the UAV. For example, if there are windy conditions and the UAV has to run at a higher throttle to remain on course, it may consume more current than on a day where the wind speed is lower. Thus, in windy conditions the battery may run out faster, so the threshold may be a higher number than on a less windy day.

Next, at step 908, the first UAV returns to the ground station. For example, the first UAV will head towards the location of the ground station and land on the exposed surface of the base plate. The cross mechanism of the base plate may rotate to contact the feet of the UAV for secure mounting and/or charging the battery of the first UAV. The base plate may rotate from the second position to the first position to store the first UAV and to allow the second UAV a spot to land on the opposing surface of the base plate.

Next, at step 910, the battery of the first UAV is charged, for example, without removal of the battery, by the ground station. For example, battery charging contacts for the UAV may be located at the base of the feet of the UAV. Corresponding contacts for the battery charger may be located on the surface of the base plate, so the cross mechanism may rotate the UAV to align the contacts from the UAVs feet with the charger's contacts for charging the battery. In another aspect of the disclosure, the battery may be charged inductively. For example, the battery charger may be located below the base plate, and when the base plate puts the UAV in a storage position, the inductive charger lines up with a charging receiver of the UAV for charging UAV's battery. In another aspect, the ground station may include a cradle on the base plate for charging the UAV when the UAV is mounted to the base plate.

Next, at step 912, a remaining battery charge signal is received from the second UAV.

Next, at step 914, the first UAV is selectively deployed from the ground station when the remaining battery charge signal of the second UAV is below a threshold value. The threshold value for the second UAV's remaining battery charge signal may be the same or different than that of the threshold value for the first UAV.

Next, at step 916, the second UAV returns to the ground station.

Next, at step 918, the battery of the second UAV is recharged by the ground station.

It should be understood that the disclosed structure can include any suitable mechanical, electrical, and/or chemical components for operating the disclosed system or components thereof. For instance, such electrical components can include, for example, any suitable electrical and/or electro-mechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An unmanned aerial vehicle (UAV) system for maintaining UAV flight continuity, comprising:
 a ground station including:
  a base plate including a first surface, a second surface, a proximal portion, a mid-portion and a distal portion, the mid-portion including a pivot member configured for lateral rotation of the base plate, the first surface configured to store and charge the first UAV and the second surface configured to store and charge the second UAV;
  a first linear rail;
  a first linear slider disposed on the first linear rail;
  a scissor lift configured to raise the mid-portion of the base plate, the scissor lift including:

a top portion including a worm drive configured to rotate the base plate;
a first leg fixedly attached to a first sidewall of the ground station;
a second leg pivotably attached to the first linear slider; and
a motor configured to actuate the second leg;
a second linear rail; and
a second linear slider disposed on the second linear rail and pivotably connected to the proximal portion of the base plate, the second linear slider configured for lateral motion along the second linear rail;
a first UAV;
a second UAV;
a processor; and
a memory, containing instructions thereon, which, when executed by the processor, cause the system to:
receive a remaining battery charge signal from the first UAV;
selectively deploy the second UAV, from the ground station when remaining battery charge signal indicates that a remaining battery charge of the first UAV is below a threshold value; and
return the first UAV to the ground station.

2. The system of claim 1, wherein the instructions, when executed by the processor, further cause the system to charge the battery of the first UAV, without removal of the battery, by the ground station.

3. The system of claim 1, wherein the base plate further includes:
a first position where the first UAV is in a launch position and the second UAV is in a storage position; and
a second position where the second UAV is in the launch position and the first UAV is in the storage position.

4. The system of claim 3, wherein when selectively deploying the second UAV, the instructions, when executed by the processor, further cause the system to rotate the base plate of the ground station from the first position to the second position.

5. The system of claim 1, wherein when selectively deploying the second UAV, the instructions, when executed by the processor, further cause the system to:
determine location information of the first UAV; and
communicate, to the second UAV, the location information of the first UAV.

6. The system of claim 3, wherein when selectively deploying the second UAV, the instructions, when executed by the processor, further cause the system to determine a charge state of the first UAV.

7. The system of claim 4, wherein when rotating the base plate of the ground station from the first position to the second position, the instructions, when executed by the processor, further cause the system to:
extend the scissor lift by actuating, by the motor, a second leg of the scissor lift, the scissor lift configured to raise a mid-portion of the base plate; and
rotate the base plate by advancing the worm drive.

8. The system of claim 1, wherein the instructions, when executed by the processor, further cause the system to rotate by a cross mechanism of the base plate, the first UAV to align the first UAV with a battery charger of the ground station.

9. The system of claim 1, wherein the ground station further includes a wireless transceiver configured to communicate battery status and location of the first UAV to a remote server.

10. A computer-implemented method for maintaining UAV flight continuity, comprising:
receiving a remaining battery charge signal from a first UAV;
selectively deploying a second UAV, from a ground station when the remaining battery charge signal indicates that a remaining battery charge of the first UAV is below a threshold value;
returning the first UAV to the ground station; and
charging the battery of the first UAV, without removal of the battery, by the ground station,
wherein the ground station includes a baseplate, and the method further includes transitioning the base plate from a first position where the first UAV is in a launch position and the second UAV is in a storage position, to a second position where the second UAV is in a launch position, and the first UAV is in a storage position.

11. The computer-implemented method of claim 10, wherein selectively deploying the second UAV includes rotating a base plate of the ground station from the first position to the second position.

12. The computer-implemented method of claim 10, wherein selectively deploying the second UAV further includes:
determining location information of the first UAV; and
communicating, to the second UAV, the location information of the first UAV.

13. The computer-implemented method of claim 10, wherein selectively deploying the second UAV, further includes determining a charge state of the first UAV.

14. The computer-implemented method of claim 11, wherein rotating the base plate of the ground station from the first position to the second position includes:
extending a scissor lift by actuating, by a motor, a first leg of the scissor lift, the scissor lift configured to raise a mid-portion of the baseplate, wherein a second leg is fixedly attached to a first sidewall of the ground station, and wherein the first leg is disposed on a linear slider; and
rotating the baseplate by advancing a worm drive disposed on a top portion of the scissor lift,
wherein a proximal portion of the base plate is pivotably connected to a second linear slider configured for lateral motion along a second linear rail.

15. The computer-implemented method of claim 10, further comprising rotating, by a cross mechanism, the first UAV to align the first UAV with a battery charger.

16. The computer-implemented method of claim 10, wherein the ground station further includes a wireless transceiver and the method further includes communicating battery status and location to a remote server.

17. The system of claim 1, wherein the instructions, when executed by the processor, further cause the system to transfer surveillance duties from the first UAV to the second UAV.

* * * * *